Oct. 15, 1929.  L. M. CIBOCH  1,731,705
DENTAL BURR CABINET
Filed July 26, 1928   2 Sheets-Sheet 1

Inventor
L. M. Ciboch
By Clarence A. O'Brien
Attorney

Oct. 15, 1929.   L. M. CIBOCH   1,731,705
DENTAL BURR CABINET
Filed July 26, 1928   2 Sheets-Sheet 2

Inventor
L. M. Ciboch
By Clarence A. O'Brien
Attorney

Patented Oct. 15, 1929

1,731,705

UNITED STATES PATENT OFFICE

LEWIS M. CIBOCH, OF BROOKFIELD, ILLINOIS

DENTAL BURR CABINET

Application filed July 26, 1928. Serial No. 295,556.

The present invention relates to improvements in dispensing racks or cabinets and has reference more particularly to a cabinet for selectively ejecting dental burrs.

One of the important objects of the present construction is to provide a dental burr cabinet that includes a rotatable drum formed with a series of radial pockets or compartments in the outer portion thereof for receiving dental burrs of different sizes, said drum being arranged within the casing that is formed in the front side with a discharge opening through which the innermost burr of the compartment disposed in alinement with the discharge opening may be ejected through said opening into a receiving tray located below the opening.

A slidable ejector is provided, the same being normally disposed in an inoperative position and being capable of manual actuation for forcing the innermost burr out of the cabinet when said ejector is actuated.

A further object is to provide a dental burr cabinet wherein means is provided for preventing retrograde movement of the rotatable drum in its casing.

Still a further object is to provide a dental burr cabinet which is simple in construction, inexpensive, strong and durable and further well adapted to the purposes for which it is designed.

Other objects and advantages will become apparent during the course of the following description.

Figure 1:
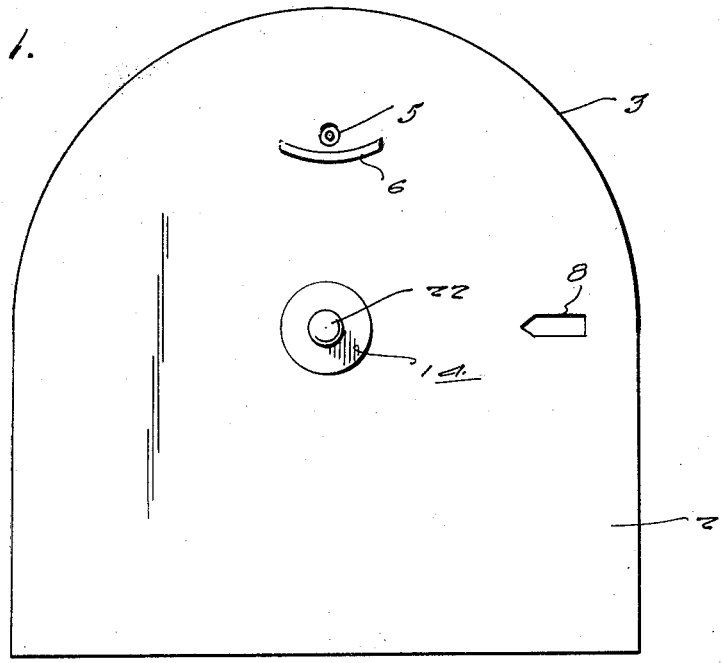
Figure 2:
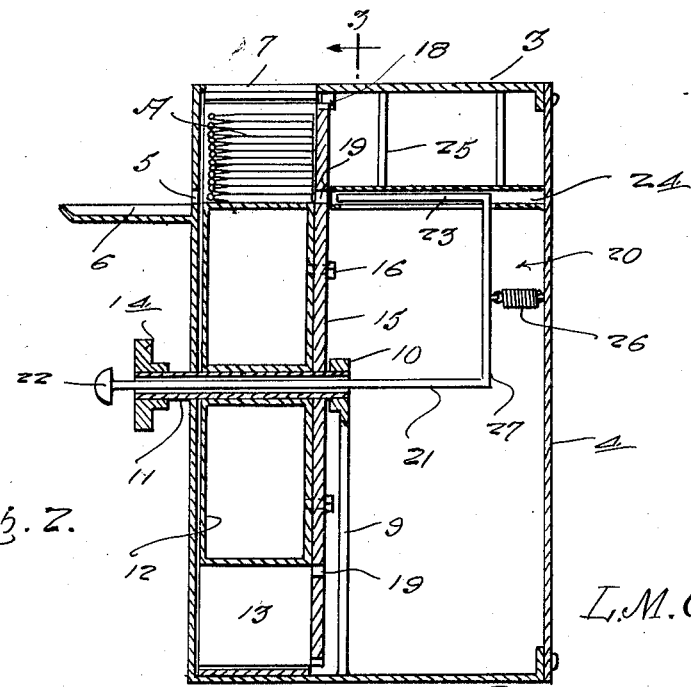
Figure 3:
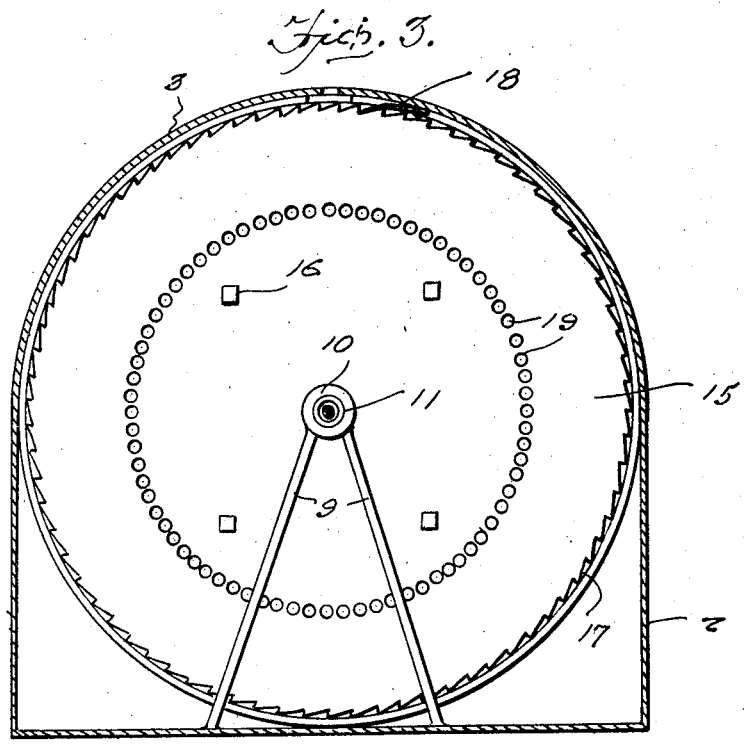
Figure 4:
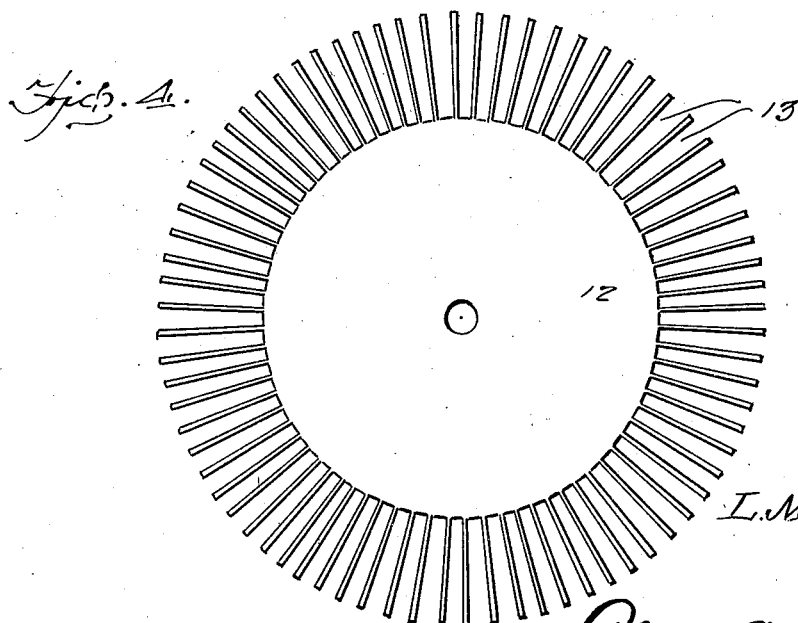

In the accompanying drawing, forming a part of this specification, and in which like numerals indicate like parts throughout the same:

Figure 1 is a front elevation of the dental burr cabinet embodying my invention, Figure 2 is a vertical sectional view taken approximately on the line 2—2 of Figure 1, Figure 3 is a sectional view taken on the line 3—3 of Figure 2, and Figure 4 is a front elevation of the rotatable drum formed with the radially disposed burr receiving compartment or socket.

In the drawings, wherein for the purpose of illustration is shown a preferred embodiment of my invention, the numeral 1 designates generally my improved dental burr cabinet the same comprising a hollow casing 2 that is open at its rear side and as is clearly shown in Figures 2 and 3, the top portion 3 is rounded. A removable cover plate 4 is provided for the open rear side of the casing as clearly shown in Figure 2.

The front side of the casing is formed with a dental burr discharge opening 5 adjacent the top central portion thereof and arranged below this opening extending forwardly from the front wall of the casing is the concaved dental burr receiving tray 6.

The rounded top portion 3 of the casing is formed with an elongated slot 7 adjacent the front wall of said casing as clearly shown in Figure 2 and the purpose of this slot will be presently described. The front wall of the casing is furthermore provided with a sight opening 8 as shown in Figure 1.

A vertically disposed standard 8 extends upwardly from the bottom of the casing inwardly of the front wall and a bearing sleeve 10 is formed on the upper end of the standard for receiving the inner end of the horizontally disposed hollow spindle 11 that is journaled for rotation through an opening formed in the central portion of the front wall of the casing and secured on the intermediate portion of the hollow spindle for rotation therewith is the hollow drum 12 that is formed at its peripheral edge portion with the radially disposed dental burr receiving compartments or pockets 13 around the entire circumference of said drum.

The outer diameter of the drum is such as to permit the rotation of the drum within the front portion of the casing. An actuating knob 14 is secured on the outer end of the hollow spindle to facilitate the turning of the drum so that any one of the compartments may be positioned in communication with the discharge opening 5.

The dental burrs are arranged in the several compartments or pockets 13 so that the burrs that are in alinement with the sight opening 8 will also be arranged in the compartment that will be in alinement with the discharge opening 5.

Secured on the rear or inner face of the hollow drum 12 is the circular plate 15, the securing means therefor being shown at 16 whereby said plate will rotate with the drum 12 and this circular plate is of substantially the same diameter as the outer diameter of the drum and is formed in its outer edge with the ratchet teeth 17 with which cooperates a spring pawl 18 attached to the rounded top 3 of the casing for the purpose of preventing rotation of the drum in one direction.

The manner in which the spring pawl cooperates with the ratchet teeth 17 is clearly illustrated in Figures 2 and 3 of the drawings.

The circular plate 15 is of course formed with a central opening to accommodate the hollow spindle 11. Furthermore the circular plate is formed with an annular series of spaced openings 19 that are arranged in alinement with the discharge opening 5 so that these openings 19 can successively communicate with the openings and the bottom or inner end portion of each compartment will be disposed below the opening 5 as suggested in Figure 2 so that the innermost dental burr A of the selected compartment or pocket will be positioned in alinement with the openings 5 and 19.

The invention further comprehends the provision of a novel ejector wherein the same includes a substantially U-shaped unit denoted generally by the reference character 20 as shown very clearly in Figure 2.

This U-shaped member is formed from a single length of wire so bent as to have one of its arms of greater length than the other and the longer arm 21 is arranged for slidable movement through the hollow spindle 11 and an actuating button 22 is arranged on the forward end of the longer arm 21.

The shorter arm 23 of this U-shaped ejector unit 20 is slidable within a suitable guide 24 suspended from the top 3 of the casing by the hangers 25 and the free end of the shorter arm 23 is adapted for movement into and out of the opening 19 that is disposed in front of the open forward end of the guide 24.

A retractile coil spring 26 is connected to the crown portion 27 of the U-shaped unit 20 and to the cover plate 4 for normally holding the ejector unit in an inoperative position as shown in Figure 2.

In the operation of the cabinet, it is of course understood that the compartments 13 are filled with burrs of different sizes. By turning the knob 14, the proper sized burr is positioned in alinement with the discharge opening 5.

A forward pull is exerted on the bottom 22 which causes the ejector unit 20 to move forwardly whereupon the forward end of the shorter arm 23 will slide through the opening 19 and will engage the rear end of the innermost burr of the selected compartment to force the same outwardly through the opening 5 into the tray 6 where the same may be easily removed for use.

After the dental burr has served its purpose, it may be replaced in its proper compartment by bringing said compartment into alinement with the slot 7 at the top of the casing and dropping the used burr through the slot.

The depth of the dental burr receiving compartment is such as to accommodate a number of burrs of the same size.

It will thus be seen from the foregoing description, that I have provided a dispensing cabinet that is particularly adapted for use in handling dental burrs and the simplicity of my construction enables a dental burr of the desired size to be readily and easily obtained.

Furthermore a dental burr cabinet of the above mentioned character can be readily and easily assembled or disassembled and can furthermore be constructed at a very low cost and yet be strong and durable.

While I have shown the preferred embodiment of my invention, it is to be understood that various changes in the size, shape and arrangement of parts may be resorted to without departing from the spirit of the invention and the scope of the appended claims.

Having thus described my invention, what I claim as new is:

1. In a dispensing cabinet of the class described, a casing provided with a discharge opening in the front wall thereof, a rotatable drum arranged within the casing directly rearwardly of the front wall thereof, a series of radially disposed article receiving compartments arranged at the outer peripheral edge portion of the drum for receiving one or more articles, means for actuating the drum to selectively position one of the compartments in alinement with the discharge opening, the bottom of the selected compartment adapted to be disposed below the discharge opening in the front wall of the casing, a plate secured to the inner side of the drum and formed with a series of spaced openings that communicate with the bottom portion of the respective compartments, ratchet teeth formed in the outer end of the plate, a spring pawl attached to the casing and cooperating with the ratchet teeth for preventing retrograde movement of the drum and the plate, an ejector movable through the opening in the plate that is alined with the discharge opening for ejecting the lowermost article in the selected magazine therefrom through the discharge opening, the top of the casing being formed with a slot arranged over the drum for depositing articles into any one of the compartments.

2. In a dispensing cabinet of the class described, a casing, the front wall of the casing being provided with an article discharge opening, a hollow spindle journaled for rotation through the front wall of the casing, a drum secured on the spindle for rotation therewith and disposed within the casing directly rearwardly of the front wall, a series of radially disposed article receiving compartments arranged at the outer peripheral portion of the drum, the bottom portion of each compartment terminating in a point below the discharge opening, a knob on the outer end of the hollow spindle for actuating the drum to selectively position any one of the compartments in alinement with the discharge opening, a circular plate secured to the inner side of the drum for rotation therewith providing a closure for the rear sides of the compartment, ratchet teeth formed in the outer edge of the plate, a spring pawl attached to the casing for cooperation with the ratchet teeth to prevent rotation of the drum and the plate in one direction, a substantially U-shaped ejector unit, one of the arms being of a greater length than the other, the longer arm extending through the hollow spindle, an actuating knob on the outer end of the longer arm, a guide for the shorter arm of said U-shaped ejector unit, the forward end of the shorter arm adapted to be disposed in alinement with the discharge opening, said circular plate being formed with an annular series of spaced openings having communication with the bottom portion of the respective compartments whereby said shorter arm of the U-shaped ejector unit may be moved through the opening in the plate of the selected compartments for ejecting the lowermost article through the discharge opening in the front wall of the casing when the actuating button on the longer arm of the U-shaped ejector is pulled outwardly, and means for returning the ejector unit to its inoperative position.

In testimony whereof I affix my signature.

LEWIS M. CIBOCH.